United States Patent [19]

Vine et al.

[11] 4,259,389
[45] Mar. 31, 1981

[54] HIGH PRESSURE-LOW POROSITY WET SEAL

[75] Inventors: Raymond W. Vine, Avon; Stephen T. Narsavage, Bolton, both of Conn.

[73] Assignee: United Technologies Corporation, Hartford, Conn.

[21] Appl. No.: 972,600

[22] Filed: Dec. 22, 1978

Related U.S. Application Data

[63] Continuation of Ser. No. 859,884, Dec. 12, 1977, abandoned.

[51] Int. Cl.³ .......................... B32B 1/04; H01M 2/08
[52] U.S. Cl. .................................... 428/192; 428/206; 428/323; 428/331; 428/402; 428/403; 428/404; 428/421; 428/422; 429/36; 429/174; 429/184; 429/185; 429/251; 429/252; 429/253; 429/254
[58] Field of Search ............... 428/402, 403, 407, 421, 428/422, 192, 194, 195, 206, 208, 323, 331, 404; 429/34–38, 174, 184, 185, 247, 251, 252, 254, 253

[56] References Cited

U.S. PATENT DOCUMENTS

| | | | |
|---|---|---|---|
| 3,282,734 | 11/1966 | Rzewinski | 429/35 |
| 3,326,722 | 6/1967 | Hasbrouck | 429/35 |
| 3,702,267 | 11/1972 | Grot | 429/251 X |
| 3,713,890 | 1/1973 | Strier et al. | 429/251 X |
| 4,048,392 | 9/1977 | Garoutte | 429/184 X |
| 4,052,537 | 10/1977 | Mallory | 429/174 |
| 4,110,518 | 8/1978 | Gilmour et al. | 429/174 |
| 4,166,157 | 8/1979 | McCormick | 429/174 |

*Primary Examiner*—Bruce H. Hess
*Attorney, Agent, or Firm*—John D. Del Ponti; Charles A. Warren

[57] ABSTRACT

A high pressure, low porosity wet seal for a substrate in a fuel cell in which the seal is made up of a granular material having a particle size varying from 10 to 0.1 microns in size bonded together with polytetrafluoroethylene to prevent leakage of the gaseous fuel or oxidant from the cell.

4 Claims, 3 Drawing Figures

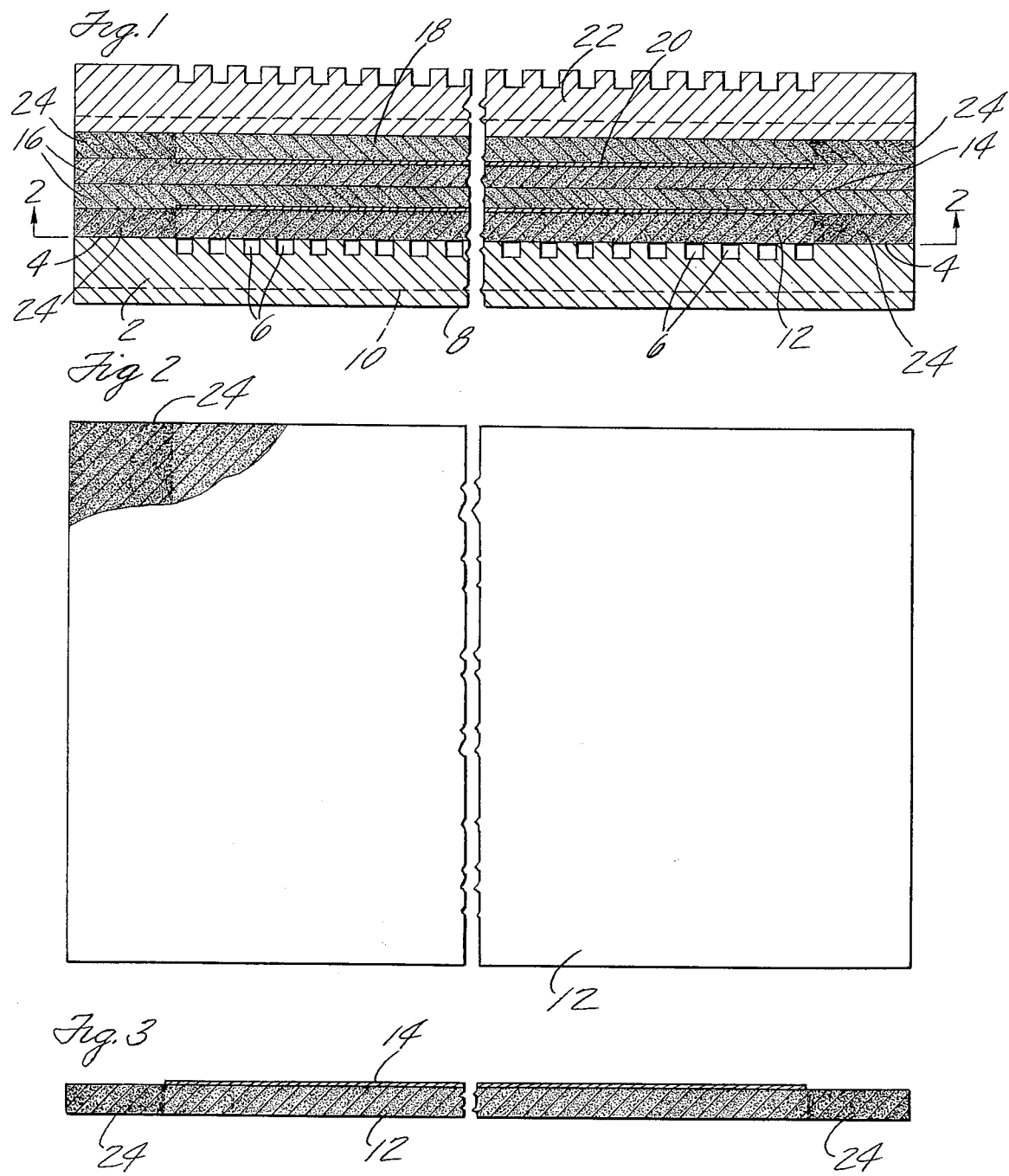

HIGH PRESSURE-LOW POROSITY WET SEAL

This is a continuation of application Ser. No. 859,884 filed on Dec. 12, 1977 now abandoned.

BACKGROUND OF THE INVENTION

In preparing a wet seal to be applied to the edges of a substrate it has been routine to select a particular relatively large particle size for the powder filler used in the impregnation or coating that forms the seal. It has been found that this does not allow adequately dense packing to assure a relatively low porosity. Not only does leakage of the gaseous fuel or oxidant occur but the seal may be still somewhat compressible when the cell components are assembled and may not seal securely against the associated separator plate and associated elements.

SUMMARY OF THE INVENTION

Accordingly, the present invention has as one feature the use of a powder filler of varying particle size which minimizes porosity by ability to produce a denser packing. This denser packing reduces compressibility and assures a better seal. Another feature is the use of a Teflon ® or the like binder for this powder filler which is inert to the acid of the cell and to the filler and will hold the particles securely in the compacted condition.

According to the invention, the edge or edges of the substrate for the fuel cell are coated or impregnated with a seal material consisting of powdered silicon carbide, carbon or graphite or the like of varying particle size from, for example, 10 to 0.1 microns and bonded with Teflon or the like to provide a very dense, relatively incompressible wet seal to minimize gas leakage from the cell.

The foregoing and other objects, features, and advantages of the present invention will become more apparent in the light of the following detailed description of preferred embodiments thereof as illustrated in the accompanying drawing.

BRIEF DESCRIPTION OF THE DRAWING

FIG. 1 is a sectional view through a part of a fuel cell utilizing the seal.

FIG. 2 is a plan view of a substrate with the seal on opposite edges.

FIG. 3 is a sectional view through the substrate of FIG. 2 on an exaggerated scale.

DESCRIPTION OF THE PREFERRED EMBODIMENT

Referring first to FIG. 1, the sectional view through a part of a fuel cell shows a gas distribution plate 2 having flat sealing surfaces 4 at opposite edges for a seal and having a plurality of parallel gas circulating grooves 6 between the surfaces 4. The opposite surface of the plate has sealing surfaces 8 at right angles to the surfaces 4 and gas circulating grooves 10 at right angles to the grooves 6. These grooves 10 and surfaces 8 form a part of the adjacent unitary cell in a stack of cells. Such a structure is well known.

Resting on the plate 2 is a substrate 12 which forms one of the electrodes of the cell and is a porous material for the passage of gas therethrough from the grooves 6. The surface of the substrate 12 opposite to the grooves will routinely have a catalyst coating 14 thereon. The substrate is porous and may be, for example, a random carbon fiber sheet. It will be understood that the thickness of certain elements is exaggerated in the drawing for the purpose of clarity.

Above the surface of the substrate and catalyst is a layer of a matrix 16 that serves to electrically isolate the electrodes and to retain the electrolyte in the cell. This matrix may be of any of the well known materials used for this purpose. It is normally a porous material, generally less porous than the substrate and may be one or more layers. Both the substrate and the matrix are the same area and shape as the distribution plate so that the edges will be engaged and clamped between adjacent distribution plates at their sealing surfaces.

On the side of the matrix opposite to the substrate 12 is the other substrate 18 of the unitary cell. This will normally be the same material as the substrate 12 and will have a catalyst 20 thereon but on the side facing the matrix. One of these substrates is the fuel electrode and the other the oxidant electrode of the unitary cell.

A distributor plate 22 similar to the plate 2 is placed on the substrate 18 as shown. In a fuel cell assembly a stack of such cells is built up and the assembly is then clamped securely so that the opposite edges of the substrates and the matrix are clamped between adjacent distributor plates.

To prevent leakage of gas from within the cell the substrates have sealing areas 24 at opposite edges to cooperate with the sealing surfaces on the plates. These sealing areas are preferably made by coating or impregnating these areas of the substrate with a silicon carbide powder bonded together with about 2% of Teflon or Teflon-like polytetrafluoroethylene material to hold the powdered material in its compacted condition. Carbon or graphite may be used in conjunction with or instead of silicon carbide powder or other materials inert to the electrolyte used in the cell. The powdered material of the seal is made up of particles of varying size from 10 to 0.1 microns as this has been found to maximize the effectiveness of the seal. Although this variation in size is desirable, for convenience it has been found that a narrower range of sizes from 10 to 1 microns or a narrower range from 5 to 1 microns with the maximum size 5 microns are adequate in most instances. This variation in size will usually produce the necessary density and incompressibility when in use as to minimize the leakage from the cell.

These sealing areas at the edges of the substrate may be produced in any of several ways, for example, the particles of varying size, with the binder particles therewith are mixed in a suitable slurry into which the edges of the substrate may be dipped to the right depth (width of seal area on substrate) and then dried. An alternative procedure may be an application of the mixture of sealant powder and binder in a suitable vehicle such as water by the silk screen process. Other techniques will be apparent. In either event, the substrate is coated with or impregnated with the sealant material to produce such a thickness and width on the opposite edge areas of the substrate that when the cell elements are assembled and clamped in a unit, the sealant material will form an effective seal when wetted by the electrolyte and form such a dense seal barrier at the edges of the substrates as to prevent or minimize the escape of gas bubbles from the cell stack when the cell is put into operation by a supply of gaseous oxidant and fuel to opposite sides of the distributor plates.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. A porous electrode substrate for a fuel cell having a seal portion along at least one edge thereof where the substrate is clamped by the sealing surfaces of the distributor plates of the cell, the seal being in a band along the edge of the electrode to prevent leakage of gas from the cell, the band being substantially the width of the sealing surfaces of the plates and in a position to be clamped thereby, the seal consisting of an inert powder selected from the group consisting of silicon carbide, carbon or graphite, this powder having a variable particle size from 10 to 0.1 microns and being mixed with about 2% of polytetrafluoroethylene as a binder, this sealing material being in a band on the substrate of such thickness and width as to be clamped by the distributor plates and prevent gas leakage past said seal during fuel cell operation.

2. A porous electrode substrate as in claim 1 in which the maximum particle size for the seal material is about 5 microns.

3. A porous electrode substrate as in claim 1 in which the size range for the seal particles is from 5 to 1 microns.

4. A porous electrode substrate as in claim 1 in which the inert powder is silicon carbide.

* * * * *